(No Model.) 2 Sheets—Sheet 1.
E. PRIDMORE.
MOWING MACHINE.
No. 528,304. Patented Oct. 30, 1894.
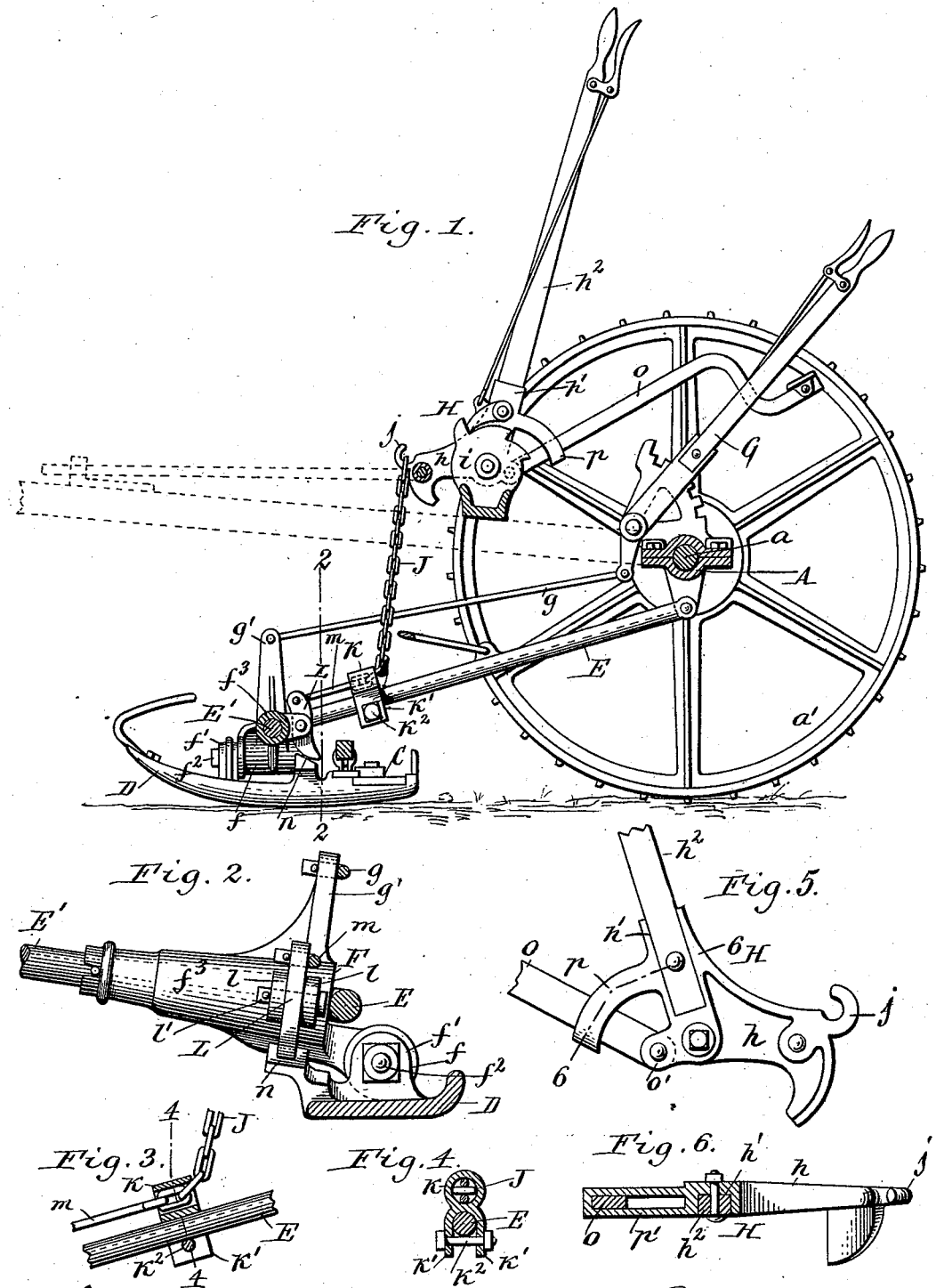
Witnesses.
Theo. L. Popp.
Chas. F. Burkhardt.
Edward Pridmore Inventor.
By Wilhelm Bonner
Attorneys.

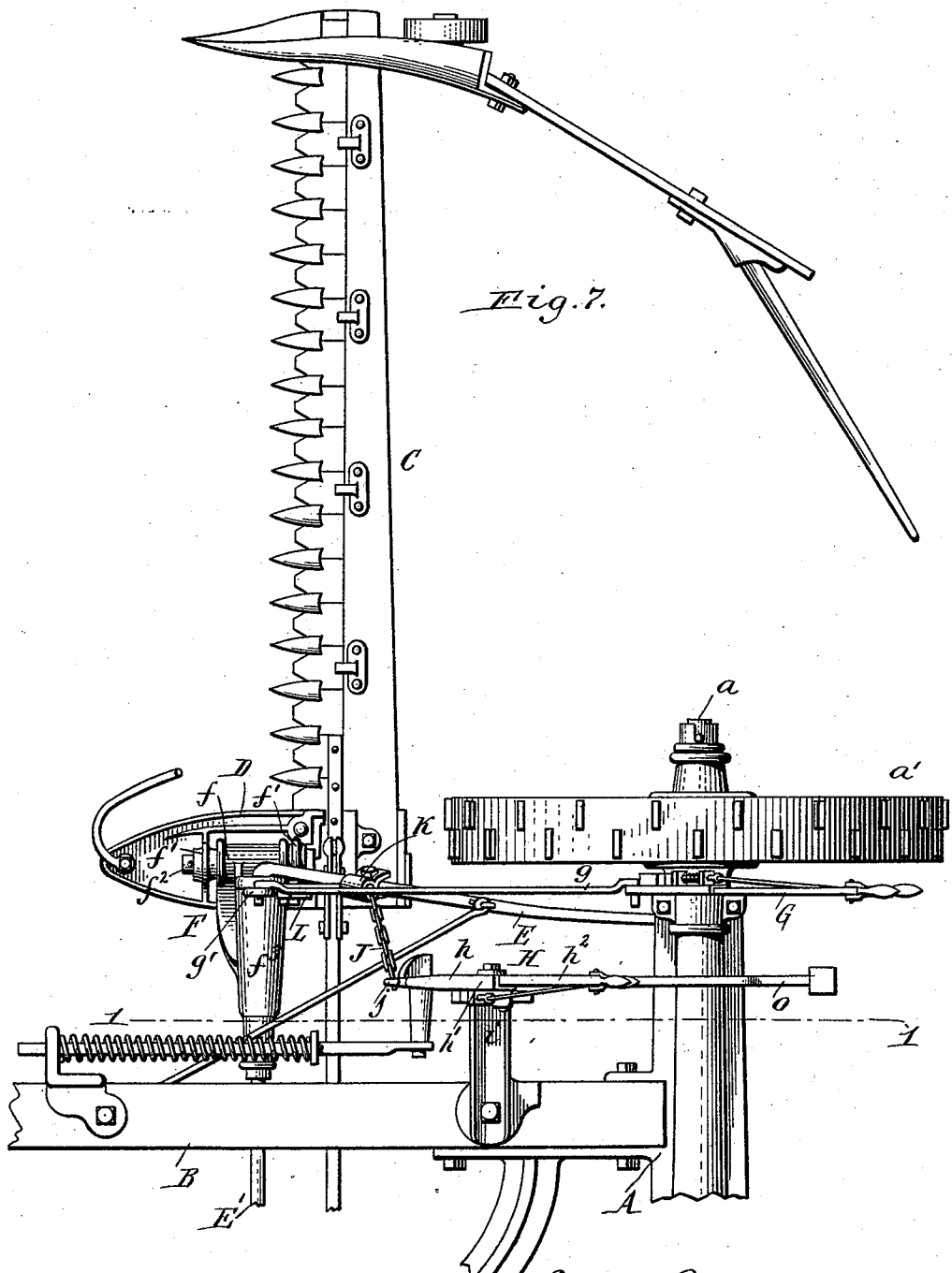

UNITED STATES PATENT OFFICE.

EDWARD PRIDMORE, OF BATAVIA, NEW YORK, ASSIGNOR TO THE JOHNSTON HARVESTER COMPANY, OF SAME PLACE.

MOWING-MACHINE.

SPECIFICATION forming part of Letters Patent No. 528,304, dated October 30, 1894.

Application filed February 8, 1893. Serial No. 461,426. (No model.)

*To all whom it may concern:*

Be it known that I, EDWARD PRIDMORE, a citizen of the United States, residing at Batavia, in the county of Genesee and State of New York, have invented new and useful Improvements in Mowing-Machines, of which the following is a specification.

This invention relates to the means whereby the cutter mechanism of a mowing machine is raised and lowered.

In the accompanying drawings consisting of two sheets:—Figure 1 is a vertical longitudinal section of my improved mowing machine, the section being taken in line 1—1, Fig. 7. Fig. 2 is a transverse section, on an enlarged scale, in line 2—2, Fig. 1. Fig. 3 is a fragmentary sectional elevation showing the means for guiding the lifting chain. Fig. 4 is a cross section in line 4—4, Fig. 3. Fig. 5 is a fragmentary side elevation of the hand and foot lifting levers. Fig. 6 is a cross section in line 6—6, Fig. 5. Fig. 7 is a fragmentary top plan view of the mowing machine.

Like letters of reference refer to like parts in the several figures.

A represents the main frame; $a$, the axle journaled therein; $a'$, one of the wheels secured to the axle, and B, the draft pole secured to the main frame.

C represents the cutter mechanism projecting laterally from one side of the machine and secured with its inner end to the shoe D. The latter is supported by a coupling frame composed of a longitudinal bar E, pivoted with its rear end to the main frame so as to swing vertically and arranged with its front end over the shoe and a transverse bar E′ extending inwardly from the front end of the longitudinal bar.

F represents the swivel or coupling piece whereby the cutter mechanism is connected with the coupling frame so as to be capable of swinging both transversely and longitudinally. This swivel piece is constructed in the usual manner and composed of a longitudinal sleeve $f$, which is pivoted to lugs $f'$ on the shoe by a longitudinal bolt $f^2$, and a transverse sleeve $f^3$ formed in one piece with the longitudinal sleeve and journaled upon the transverse bar E′ inside of the longitudinal bar E. Upon raising the cutter mechanism it swings transversely in the machine on the pivot bolt $f^2$ and upon turning the transverse sleeve $f^3$ the cutter mechanism is tilted lengthwise in the machine.

G represents the tilting lever whereby the cutter mechanism is tilted and which is pivoted upon a segmental bracket arranged upon the main frame over the axle. The lower arm of the tilting lever is connected by a rod $g$ with an upwardly extending arm $g'$ formed on the transverse sleeve of the swivel piece in the usual manner.

H represents the hand lifting lever whereby the cutter mechanism is raised and lowered by hand. The lower arm $h$ of this lever is preferably cast with a socket $h'$ in which the upper arm $h^2$ is secured and is pivoted to a bracket $i$ arranged on the draft pole.

J represents a lifting chain which is attached with its upper end to a hook $j$ formed on the lower arm $h$ of the lifting lever and which passes with its lower portion through a loop $k$ arranged on the longitudinal bar of the coupling frame in rear of the swivel piece. This loop is provided with two depending lugs $k'$ which straddle the longitudinal bar and are secured thereto by a clamping bolt $k^2$ which connects these lugs underneath said bar, as shown in Figs. 1, 3, 4 and 7.

L represents a gag lever whereby the outer end of the cutter mechanism is raised in advance of its inner end upon shifting the lifting lever. This gag lever is arranged between two lugs $l\, l$ formed on the rear side of the transverse sleeve $f^3$ and is pivoted thereto, between its upper and lower arms, by a transverse pivot bolt $l'$, so that the gag lever swings lengthwise of the machine. The upper arm of the gag lever is connected with the lifting chain by a rod $m$ which is arranged with its rear end in the loop $k$. The lower arm of the gag lever is curved and is adapted to bear against an inclined toe $n$ formed on the shoe inside of the longitudinal pivot of the cutter mechanism. When both the stubbleward and grainward wheels and the cutter mechanism rest upon a lovel surface, the toe of the shoe stands a short distance below the lower arm of the gag lever as represented in Fig. 1. This space permits the outer portion of the cutter mechanism to drop a corresponding distance when the surface over which the cutter mechanism travels is lower than that of the wheels or when the stubbleward wheel drops into a depression below the level of the grainward wheel and cutter mechanism.

Upon moving the upper arm of the lifting lever rearwardly the initial portion of this movement draws the lower portion of the lifting chain and the connecting rod rearwardly through the loop which causes the gag lever to swing on its pivot and take up the space between it and the toe. The subsequent movement of the lifting lever depresses the toe thereby raising the outer end of the cutter mechanism. When the lifting chain has been entirely withdrawn from the loop the further movement of the connecting rod through the loop is arrested because the chain now exerts a pull upon the rod nearly at right angles to the loop and rod. This causes the final portion of the rearward movement of the lifting lever to raise the coupling frame, shoe and cutter mechanism together. The connecting rod $m$ is of such length that when it reaches the limit of its forward movement its rear end is still in the guide loop $k$.

If the lifting chain were carried directly from the lifting lever to the gag lever, considerable slack would be produced in the chain upon tilting the swivel piece and cutter mechanism and moving the upwardly projecting arm rearwardly. This slack would prevent the prompt raising of the cutter mechanism. By arranging the connecting rod nearly horizontally and the lifting chain vertically, or nearly so, and passing them through a loop on the coupling frame the slack produced in the chain by the tilting of the cutter mechanism is reduced to a minimum. The connecting rod avoids all slack between the gag lever and the loop $k$ and prevents the chain from interfering with the pitman.

O represents a foot lever whereby the cutter mechanism can be raised by the foot. This foot lever is arranged in rear of and below the hand lifting lever and is pivoted with its front end to a lug $o'$ formed on the rear side of the lower arm of the lifting lever.

$p$ represents a supporting loop whereby the foot lifting lever is supported and guided between its pivot and free end. This supporting loop is preferably cast in one piece with the lower arm of the hand lifting lever. The foot lifting lever rests against the lower or rear end of this loop when in its normal position. Upon depressing the foot lever, it carries the hand lever with it, until the foot lever strikes the upper side of the main frame, when the further downward movement of the foot lever is arrested. After the foot lever has reached the limit of its downward movement, the hand lever is permitted to continue its backward and downward movement during which movement the supporting loop slides upon the foot lever.

I claim as my invention—

The combination with the main frame, the coupling frame, the shoe pivoted on the coupling frame, and the cutter mechanism pivoted on the shoe, of a gag lever arranged on the coupling frame and bearing with its lower arm against the shoe, a loop arranged on the coupling frame in rear of the gag lever, a lifting lever arranged on the main frame above the loop, a chain arranged with its lower end in said loop and secured with its upper end to the lifting lever, and a rod secured with its front end to the upper arm of the gag lever and with its rear end to the lower end of the chain, substantially as set forth.

Witness my hand this 4th day of February, 1893.

EDWARD PRIDMORE.

Witnesses:
E. K. CALKINS,
E. W. ATWATER.